UNITED STATES PATENT OFFICE.

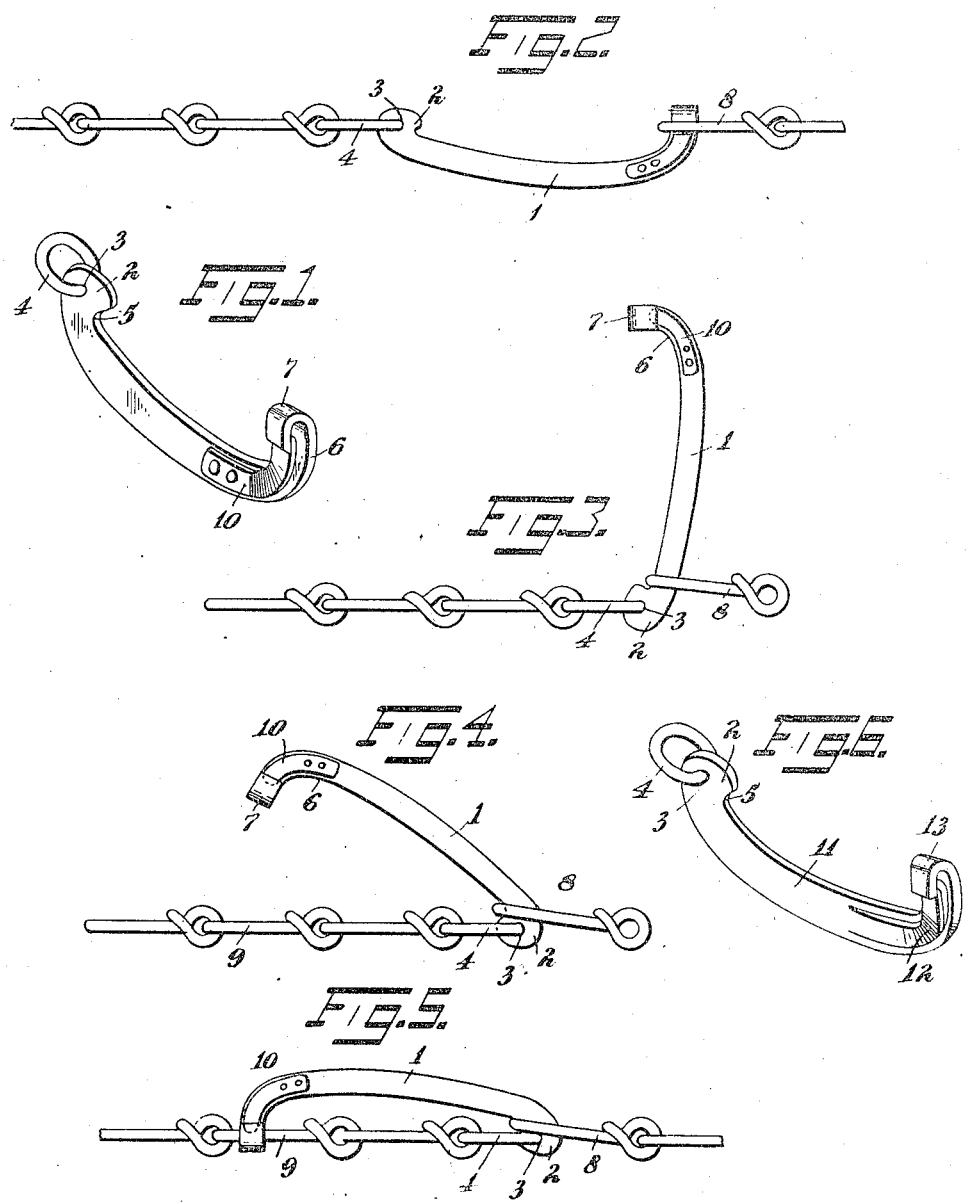

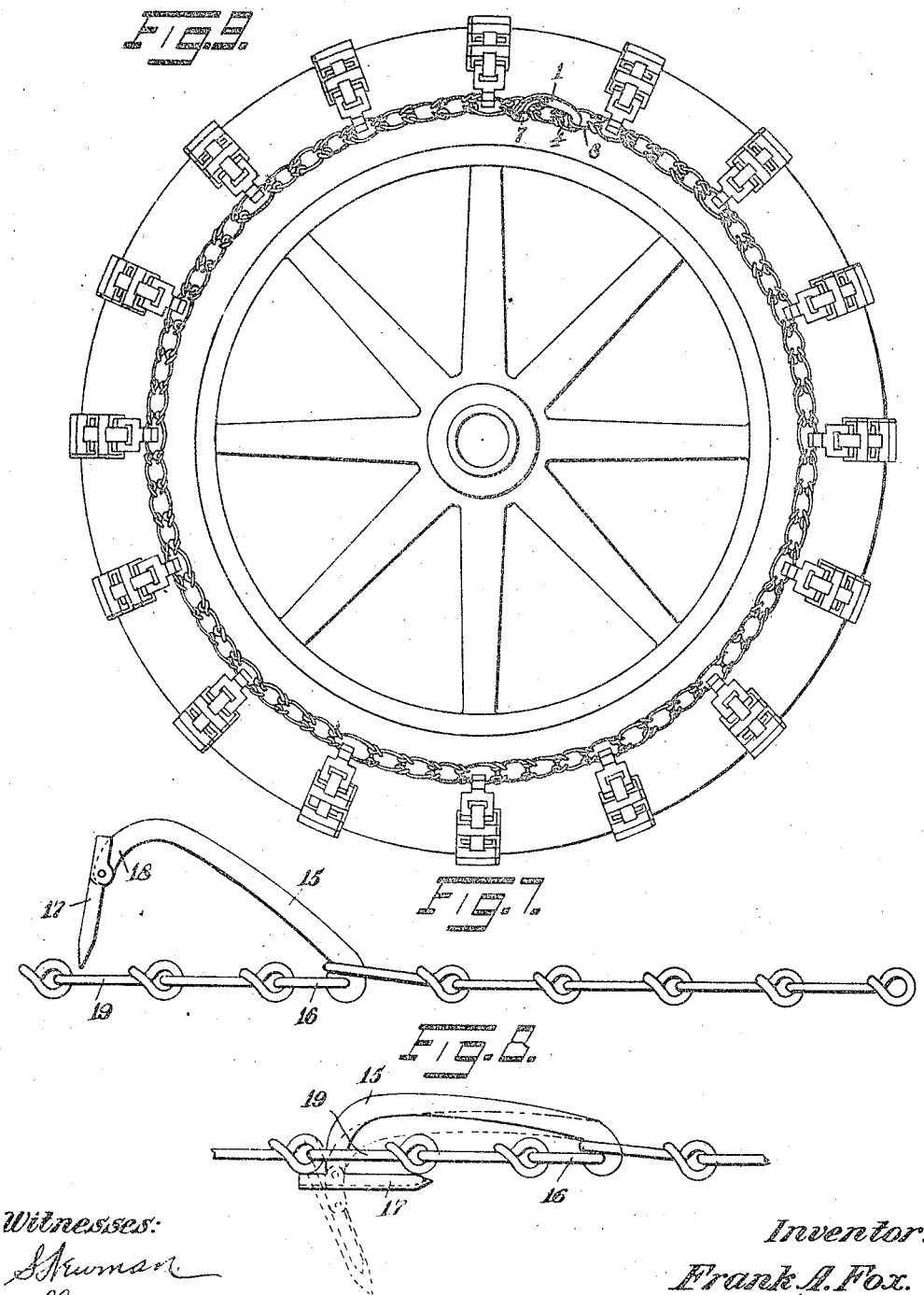

FRANK A. FOX, OF NEW YORK, N. Y., ASSIGNOR TO FOX METALLIC TIRE BELT COMPANY, OF NEW YORK, N. Y., A CORPORATION OF NEW YORK.

CHAIN TIGHTENER AND LOCK.

934,154.  Specification of Letters Patent.  Patented Sept. 14, 1909.

Application filed December 22, 1908. Serial No. 468,773.

*To all whom it may concern:*

Be it known that I, FRANK A. FOX, a citizen of the United States, residing in New York city, in the county of New York and State of New York, have invented certain new and useful Improvements in Chain Tighteners and Locks, of which the following is a specification.

This invention relates to locking and adjusting devices for chains, and has for its object to provide a lever connected with one end of a chain that can engage any one of several links in another part of the same or another chain and will serve to draw the two ends of the chain tightly together and lock the same and at the same time be easily disengaged for removing or adjusting the chain.

The device is especially advantageous for use in bringing together and securing the side members of chains of anti-skid attachments of the chains of tires of automobiles or vehicles, whereby the device can be placed around the wheel and locked in position by this lever attachment and secured very tightly on the wheel; yet can be readily disengaged to remove the anti-skid device, and can be easily handled without the use of any tools whatever.

In the accompanying drawings showing embodiments of my invention, Figure 1 shows the lever in perspective. Fig. 2 is a side elevation of the lever attached to a chain, with the hook end entered in a link of the other end of the chain. Fig. 3 is a view similar to Fig. 2 showing the lever passed through the link and swung to tighten the chain. Fig. 4 is a view similar to Fig. 3 showing the lever further advanced. Fig. 5 is a view similar to Fig. 4 showing the lever in the final locked position. Fig. 6 shows a slight modification of the lever shown in Fig. 1. Figs. 7 and 8 show a modified form of lock for the lever in different positions; and Fig. 9 shows the device as used on an anti-skid attachment for tires.

The lever is shown in Figs. 1–6 as comprising a shank portion 1 having a head 2 at one end provided with a hole 3 for engaging the end link 4 of a chain. This forms the pivot of the lever. This head also contains a recess 5 adjacent the shank portion. The other end of the lever has a portion transversely disposed relative to the shank 1 and the hole 3 bent to form a hook 7 whose channel is parallel with the shank 1. The free or hook end 6 is inserted in a link 8 in the other end of the chain, or another chain according to the use of the device, as indicated in Fig. 2. Then the lever is swung on its pivotal connection at 3 with the link 4, as indicated in Fig. 3, which will cause the link 8 to slide along the shank until it reaches the recess 5; this will bring the two ends of the chain into close proximity. The further swinging of the lever will cause the links 4 and 8 to further advance and to slightly overlap as indicated in Fig. 4, and thus it will be seen, the chain will be under a very strong leverage because of the proximity of the link 8 to the pivot of the lever at the hole 3. By this means the chains can be tightened under great pressure and very strongly drawn together. The lever is now swung down until its hook end 6 enters one of the links as 9 of the chain to which the lever is pivoted, and the lever is locked in this position by suitable means whereby the links 4 and 8 will be secured in this position. The hook end is preferably caused to engage the side of the link, and is retained in this position by a spring tongue 10 that may be riveted to the shank 1. This will secure the lever in position, but permit its easy removal by simply pressing down the spring tongue by the thumb or finger. If desired the lever may have an integral spring tongue; in Fig. 6 the lever 11 is shown as having an integral tongue 12 that serves to lock the hook 13 in the link.

By reference to Fig. 5 it will be seen that the recess 5 is disposed at a position sufficiently laterally of the line of the chain; which is the line from the hole 3 to the channel of the hook; that the link 8 will be firmly held against the pivot portion of the link 4 by means of the lever when this is in its locked position.

Another form of lock device for the lever is shown in Figs. 7 and 8 in which the lever 15 that is pivoted to the link 16 has a bar 17 pivoted to its transverse end 18. When the bar extends in alinement with the bent end 18 as shown in Fig. 7, the end of the bar is passed through one of the links 19 of the chain as indicated in Fig. 8. Then the bar is swung to a transverse position as shown in Fig. 8, that will prevent the removal of the lever end from the link and lock it in this position. To disengage the lever, it is only necessary to shift the cross bar to the straight position, when it can be withdrawn from the link.

When the tightening device is used on a tire chain as indicated in Fig. 9, the lever is attached to one end of the side chain, and it can engage the end link at the opposite end of the side chain to tighten the device on the wheel. But if this does not give sufficient tension on the tire chain, the lever is passed through the second or third link at the other end of the tire chain; whereby any desired adjustment can be obtained. By means of the great leverage when the link at the other end part of the chain is resting in the recess of the lever, the chain can be brought to engage the tire under a strong pressure. And this device will not require the use of a wrench or a lever of any kind, but can be readily operated by the hands of the chauffeur to properly lock the tire chain on the wheel. And to remove the same it is only necessary to disengage the hook by pressing down the spring tongue, or to swing the cross lever in the modification set forth.

Having thus described my invention, I claim:

1. The combination with a chain, of a lever pivoted at one end upon one of the links of the chain and means carried by the other end of the lever for engaging the chain, said lever being provided with a cam face near its pivot and a recess at the end of said cam face and occupying a position laterally of a line from the pivot to the chain engaging means.

2. The combination with a chain, of a lever pivoted at one end upon one of the links of the chain, an integral snap hook on the other end of the lever extending transversely for engagement with a link of the chain when the lever is swung back upon the chain, said lever being provided with a cam face near its pivot and with a recess at the end of said cam face occupying a position laterally of the line from the pivot to the chain engaging means.

FRANK A. FOX.

Witnesses:
  FRED. J. DOLE,
  HENRY E. GREENWOOD.